July 10, 1923.
J. W. WHITE, JR
MOTOR VEHICLE
Filed April 5, 1919
1,461,715
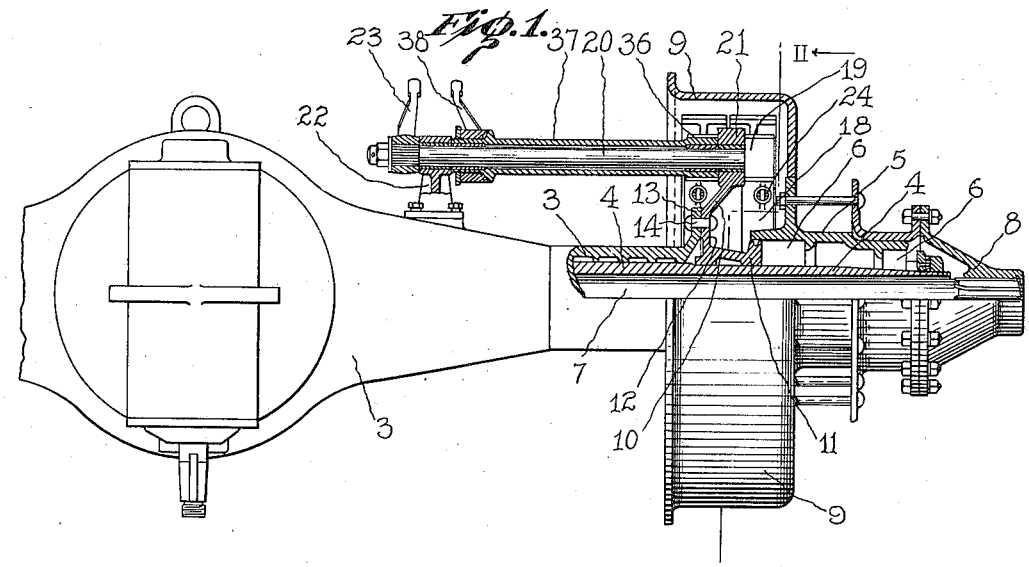
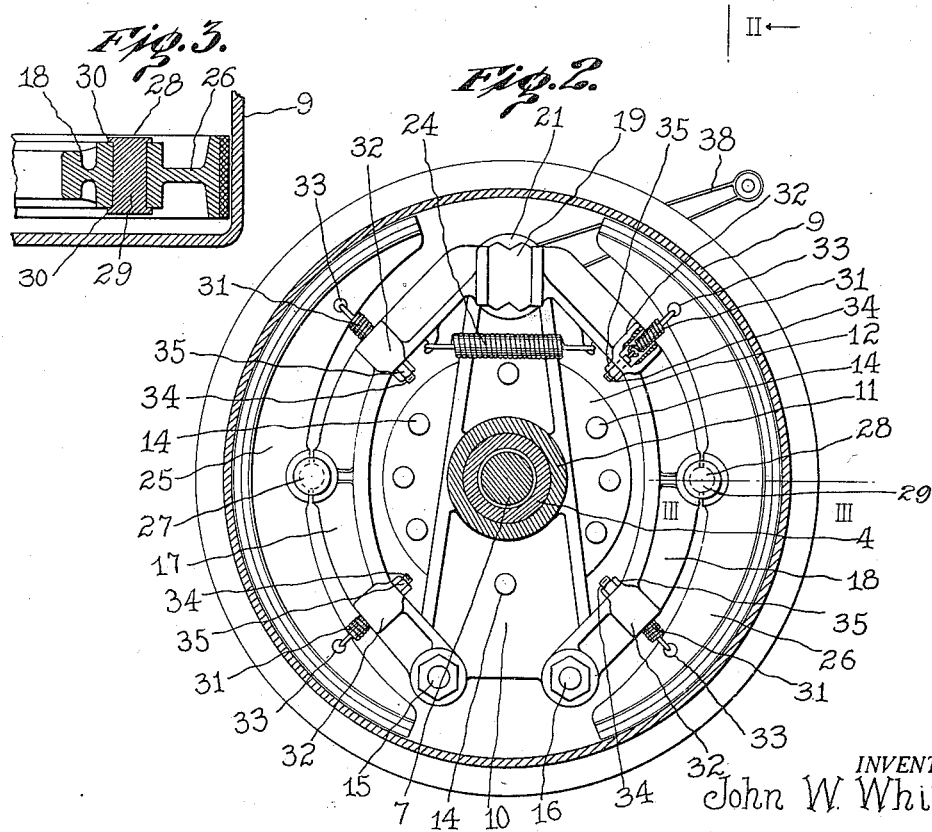
INVENTOR.
John W. White Jr.
BY
Lloyd Blackmore
ATTORNEY.

Patented July 10, 1923.

1,461,715

UNITED STATES PATENT OFFICE.

JOHN W. WHITE, JR., OF DETROIT, MICHIGAN, ASSIGNOR TO GENERAL MOTORS CORPORATION, OF DETROIT, MICHIGAN, A CORPORATION OF DELAWARE.

MOTOR VEHICLE.

Application filed April 5, 1919. Serial No. 287,894.

*To all whom it may concern:*

Be it known that I, JOHN W. WHITE, Jr., a citizen of the United States, and resident of Detroit, Wayne County, State of Michigan, have invented certain new and useful Improvements in Motor Vehicles, of which the following is a specification.

My invention relates to brake mechanism designed especially for use with automobiles, motor trucks, and similar self propelled vehicles, although the same is capable of use in other relations, and in fact in any service wherein the movement of a moving mechanism machine or device has to be arrested.

My invention has special reference to brake mechanism of the class or type wherein a rotating cylindrical brake drum is present, and in which brake shoes held against rotary movement and which are forced against the inner or outer surface of the said drum by suitable brake applying mechanism, to thereby accomplish the braking action, are employed, and one object of my invention is to provide improved means for adjusting the brake shoes in such a way that the peripheral surfaces thereof which contact with the interior of the drum will lie closer to the inner surface thereof when the brake mechanism is not acting and the brakes are off, than has heretofore commonly been the case, so that the shoes will have to be moved a minimum distance in order to bring them into engagement with the drum, and wherein the said shoes will contact with the drum throughout their entire areas at one and the same time when the brakes are applied.

A further object of my invention is to provide improved brake mechanism wherein improved brake applying means is present for forcing the brake shoes into contact with the inner surface of the brake drum, and wherein the pressure with which the shoes are forced against the drum will be substantially uniform throughout the entire area of the said shoes.

A further object of my invention is to provide improved brake mechanism of the class described and wherein the brake shoes may be readily removed from the remaining portion thereof, for the purpose of applying new bearing surfaces or linings to them, without removing the brake drum or disassembling the operating mechanism whereby the shoes are forced into engagement with the interior of the drum.

With the above and other objects of invention in view, my invention consists in the improved brake mechanism for self propelled vehicles illustrated in the accompanying drawing, described in the following specification, and particularly claimed in the concluding claims, and in such variations and modifications thereof as will be obvious to those skilled in the art to which my invention relates.

In the drawing accompanying and forming a part of this specification and wherein the preferred embodiment of my invention is illustrated:

Figure 1 is a view partly in elevation and partly in section, and wherein my invention is illustrated;

Figure 2 is a view showing a section of my invention taken upon vertical transverse planes indicated by the broken line II—II, Figure 1, looking toward the left, and;

Figure 3 is a fragmentary view upon a somewhat larger scale and showing a section upon a plane indicated by the line III—III, Figure 2.

Referring now to the drawing, the reference numeral 3 designates the external shell or casing of the rear axle of a motor truck or similar self propelled vehicle, and 4 a hollow supporting shaft from which the hub 5 of the wheel of the vehicle is supported through suitable roller or other form of bearings designated by the numeral 6, the hub being driven from suitable gearing located at the central portion of the axle through a floating driving shaft 7, the outer end of which is operatively connected with the hub through and by means of a cap 8 and driving connection between the same and the hub, as is common in axle construction of the class referred to.

Secured to the hub 5 in any way so as to rotate therewith is a hollow cylindrical brake drum 9, and the numeral 10 designates a spider or support located within the said drum and which is held stationary with reference thereto, and which support is shown as provided with a central hub 11 surrounding the supporting shaft 4, the said spider being secured to the casing or housing 3 in any way, as by means of flanges 12, 13 upon the spider and upon the casing 3 and rivets 14 extending through the said flanges, in the embodiment of my invention illustrated in the drawing.

Pivotally supported from the lower end of the spider or support 10 at 15, 16 are two oppositely disposed brake shoe supporting and operating levers 17, 18 curved in form so as to clear the spider, and the free upper ends of which levers lie adjacent one another and between which upper ends an operating cam 19 or a functionally equivalent element for forcing the said levers apart is located, the said cam being fast upon the outer end of an oscillating shaft 20 supported within a bearing carried by an upwardly extending arm 21 of the support or spider. The inner end of the shaft 20 is shown as supported by a pedestal 22 carried by the housing 3, and motion is transmitted to the said shaft from any suitable brake applying member or device through an arm 23 fast upon the inner end of the said shaft. The free upper ends of the levers 17, 18 are drawn toward one another to thereby normally keep the brake shoes out of contact with the inner surface of the brake drum 9 by means of a spring 24, the ends of which are operatively connected with the said levers, as best shown in Figure 2 of the drawing.

Carried by the brake levers 17, 18 and operated thereby are two brake shoes 25, 26 the outer portions of which are arcuate in form, and concentric with the inner surface of the cylindrical brake drum 9, and are commonly faced with a suitable brake lining made of any suitable material, and which outer portions or surfaces are adapted to be formed against the inner surface of the drum when the levers aforesaid are forced apart, motion being transmitted to the shoes through rocking bearings 27, 28 provided between the levers and the shoes, when the brake is applied, as will be appreciated, the said bearings being located at the middle portions of the shoes and the shoes being located within the brake drum in the embodiment of my invention illustrated in the drawing.

The rocking bearings between the brake levers 17, 18 and the brake shoes 25, 26 may be of any suitable form and construction in my invention, regarded in its broader aspect. In the form of my invention illustrated, however, the said bearings are provided by spool-shaped members 29, see Figure 3, having each a central cylindrical portion adapted to lie within seats of corresponding form provided, respectively, upon the levers and upon the shoes, and which members are provided with flanges 30 at their ends, which flanges extend slightly beyond the bearings or seats and overlie the adjacent edges of the levers and shoes, whereby the said members are held in place and movement of the same along their axes is prevented.

The brake shoes are held in place relative to the levers whereby they are supported and operated, and the spool-shaped pivotal members held within the seats aforesaid wherein they rest, by means of tension springs 31, two associated with each shoe, the said springs being located one upon each side of the rocking bearing whereby the shoe is supported, and preferably adjacent the ends thereof, the ends of the said springs being connected one with a shoe and the other with the lever whereby the shoe in question is supported and operated.

These springs are preferably housed in part in recesses provided by hollow bosses 32 formed upon the brake operating levers to receive them, the outer ends of the springs are provided with hooks which engage holes 33 in the brake shoes, and the inner ends thereof are connected with threaded rods 34 whereby the tension of the said springs may be adjusted by means of nuts 35 in threaded engagement with the said rods, the mechanism aforesaid providing means for tipping the shoes upon their bearings to thereby adjust them so that their peripheral surfaces will lie close to and be concentric with the inner surface of the brake drum, and for securing an equalization of the pressure throughout the entire areas of the peripheries of the shoes should one end of a shoe contact with the drum slightly before the other when the shoes are forced against the drum, as will be appreciated.

In view of the premises it will be appreciated that the spool-shaped pivot members 29 whereby the rocking bearings aforesaid are provided are held in place within the seats provided for them in the levers and in the brake shoes by the tension of the springs 31, and by the flanges 30 or functionally equivalent means for preventing them from moving along their axes, the said pivotal members being unconnected in any positive manner either with the levers or with the shoes.

The springs 31 being disposed one upon either side of each rocking bearing it will be appreciated that the shoes may be tipped upon the said bearings, by adjusting the nuts 35 upon the threaded rods 34, and the shoes so adjusted that the space between the periphery of each and the inner surface of the brake drum will be uniform throughout the entire extent of the shoe, from which it follows that when the brake applying levers are moved apart, as by the cam 19, every portion of the periphery of the shoe will contact with the inner surface of the brake drum at one and the same time, and that the pressure per unit area will be uniform throughout the entire area of contact between the periphery of the shoe and the inner surface of the drum, because of the central location of the rocking bearings relative to the shoes, the symmetrical disposition of the shoes about the pivotal connection provided by the said rocking bearings, and the cushioning effect provided by one or another of the springs associated with a shoe should one end thereof contact with the interior of the drum slightly before the other when the brakes are applied.

Finally it will be observed that when it becomes necessary to renew the lining or facing material upon the peripheries of the shoes the tension to which the springs 31 are normally subjected may be relieved by loosening the nuts 35, the springs may then be unhooked from the shoes, and the spool-shaped bearings 29 removed from between the levers and the shoes, whereupon the brake shoes may be removed from within the drum 9 by sidewise movement imparted thereto, and without removing the wheel or disassembling the brake mechanism further than is above pointed out.

In the embodiment of my invention illustrated two pairs of brake operating levers, all supported from the spider 10 and each of which levers carries a brake shoe, are employed, the second pair of levers being operated by a second cam 36 secured to the outer end of a hollow shaft 37 which surrounds and is supported by the shaft 20 and is operated by an arm 38 at its inner end. The two sets of brakes thus provided and shown, however, are alike in all essential particulars; all the brake shoes may be moved sidewise and past the spider 10 and thus removed from within the drum 9 when it is desired to renew the brake lining upon their peripheries, and either one or a plurality of sets such as have been hereinbefore described singly may be employed in a given brake mechanism, all as will be appreciated.

As changes of construction could be made within the scope of my invention, it is intended that all matter contained in the above description or shown in the accompanying drawings shall be interpreted as illustrative and not in a limiting sense.

Having thus described and explained my invention, I claim and desire to secure by Letters Patent:—

1. In brake mechanism of the class described, a hollow cylindrical brake drum, a support located within said drum, two oppositely arranged brake levers one end of each of which is pivotally supported from said support, and the free ends of which levers lie adjacent one another, and operating cam supported by said support and located between the free ends of said levers, two brake shoes located within said drum and operated by said levers, and which shoes are adapted to engage the inner surface of said drum, rocking bearings at the middle portions of each of said brake shoes and through which movement is transmitted from said levers to said shoes, and two adjustable tension springs associated with each of said shoes and disposed adjacent the ends thereof, one end of each of said springs being permanently connected with the shoe and the other end thereof being detachably connected with the operating lever for the said shoe, and which springs serve to maintain the elements which form said rocking bearings in operative relation with one another.

2. In brake mechanism of the class described, a hollow cylindrical brake drum, a support located within said drum, two oppositely arranged brake levers one end of each of which is pivotally supported from said support, and the free ends of which levers lie adjacent one another, an operating member interposed between the free ends of said levers and adapted to force them apart, two brake shoes located within said drum and operated by said levers, and which shoes are adapted to engage the inner surface of said drum, rocking bearings at the middle portions of each of said brake shoes and through which movement is transmitted from said levers to said shoes, and the construction of which bearings is such that said shoes may be disengaged from said levers and moved sidewise and out of said drum without disassembling the brake mechanism, and two adjustable tension springs associated with each of said shoes and disposed adjacent the ends thereof, one end of each of said springs being connected with the shoe and the other with the operating lever for the said shoe, and which springs serve to maintain the elements which form said rocking bearings in engagement with one another.

3. In brake mechanism of the class described, a hollow cylindrical brake drum, a support located within said drum, two oppositely arranged brake levers one end of each of which is pivotally supported from said support and each of which levers is provided with two recesses, and the free ends of which levers lie adjacent one another, means for forcing the free ends of said levers apart, tension springs located within the recesses aforesaid two brake shoes located within said drum and operated by said levers and with which shoes the said tension springs are connected, and which shoes are adapted to engage the inner surface of said drum, and rocking bearings at the middle portion of each of said brake shoes and between the tension springs aforesaid, and through which bearings movement is transmitted from said levers to said shoes, the construction of said bearings being such that said brake shoes may be disengaged from said levers and moved sidewise and out of said drum upon relieving the tension of said springs, and without disassembling the said brake mechanism.

4. In brake mechanism of the class described, a hollow cylindrical brake drum, a support located within said drum, two oppositely arranged brake levers one end of each of which is pivotally supported from said support, and the free ends of which levers lie adjacent one another, an operating cam located between the free ends of said levers, two brake shoes located within said drum and operated by said levers, and which shoes are adapted to engage the inner surface of said drum, a cylindrical member interposed between each shoe and its operating lever and fitting into seats of corresponding form upon the lever and the shoe, and whereby rocking bearings are provided through which movement is transmitted from said levers to said shoes, means for preventing movement of said cylindrical members along their axes, and two adjustable tension springs associated with each of said shoes and disposed adjacent the ends thereof and the ends of which are connected, respectively, with said shoes and with said levers, and which springs serve to maintain the elements which form said rocking bearings in operative relation with one another.

5. In brake mechanism of the class described, a hollow cylindrical brake drum, a support located within said drum, two oppositely arranged brake levers one end of each of which is pivotally supported from said support, and the free ends of which levers lie adjacent one another, means for forcing the free ends of said levers apart, two brake shoes located within said drum and operated by said levers, and which shoes are adapted to engage the inner surface of said drum, a cylindrical member interposed between each shoe and its operating lever and fitting into seats of corresponding form upon the lever and the shoe, and whereby rocking bearings are provided through which movement is transmitted from said levers to said shoes, flanges upon the ends of said cylindrical members for preventing movement thereof along their axes, and two adjustable tension springs associated with each of said shoes and disposed adjacent the ends thereof and the ends of which are connected with said shoes and with said levers, and which springs serve to maintain the elements which form said rocking bearings in operative engagement with one another.

6. In brake mechanism of the class described, a hollow cylindrical brake drum, a support located within said drum, two oppositely arranged brake levers one end of each of which is pivotally supported from said support, and the free end of which levers lie adjacent one another, an operating member interposed between the free ends of said levers and adapted to force them apart, two brake shoes located within said drum and operated by said levers, and which shoes are adapted to engage the inner surface of said drum, rocking bearings at the middle portions of each of said brake shoes and through which movement is transmitted from said levers to said shoes, and the construction of which bearings is such that said shoes may be disengaged from said levers and moved sidewise and out of said drum without dis-assembling the brake mechanism, and two adjustable tension springs associated with each of said shoes and disposed adjacent the ends thereof, one end of each of said springs being connected with the shoe through a detachable hook connection and the other with the operating lever for the said shoe, and which springs serve to maintain the elements which form said rocking bearings in engagement with one another.

7. In brake mechanism of the class described, a hollow cylindrical brake drum; a support located within said drum; a brake lever pivotally supported from said support; operating means adapted to swing said lever about its point of support; a brake shoe located within said drum and operated by said lever, and which shoe is adapted to engage the inner surface of said drum; a rocking bearing located at the middle portion of said brake shoe and through which movement of said lever is communicated to said shoe, and the construction of which bearing is such that said shoe may be disengaged from said lever and moved sideways and out from said drum without disassembling the brake mechanism; and two adjustable tension springs associated with said brake shoe and disposed one upon either side of said bearing, one end of each of said springs being detachably connected with said shoe and the other with said operating lever, and which springs serve to maintain the elements which form said rocking bearing in engagement with one another.

8. In brake mechanism of the class described and in combination with a cylindrical brake drum, a brake shoe adapted to contact with the periphery of said brake drum; a movable brake shoe operating member; a rocking bearing between said operating member and the middle portion of said brake shoe and the construction of which bearing is such that movement of said operating member is communicated to said brake shoe through a pushing action, and in one direction only; and two springs associated with said brake shoe and located one upon each side of the bearing aforesaid and the ends of which springs are connected, respectively, one with said operating member and the other with said shoe; said springs being both under tension and acting to maintain the elements which provide said rocking bearing in engagement with one another, and the ends thereof which are connected with said shoes being readily detachable therefrom, without disassembling the springs from the operating members.

9. In brake mechanism of the class described and in combination with a cylindrical brake drum, a brake shoe adapted to contact with the periphery of said brake drum; a pivotally supported brake operating lever; a rocking bearing between said brake operating lever and the middle portion of said brake shoe and the construction of which bearing is such that movement of said lever is communicated to said brake shoe through a pushing action, and in one direction only; and two adjustable springs associated with said brake shoe and located one upon each side of the bearing aforesaid and the ends of which springs are connected, respectively, one with said lever and the other with said shoe; said springs being both under tension and acting to maintain the elements which provide said rocking bearing in engagement with one another, said springs being permanently assembled with said lever and one end of each being detachably connected with the shoe with which it cooperates.

10. In brake mechanism of the class described and in combination with a cylindrical brake drum, a brake shoe located within and adapted to contact with the interior of said brake drum; a pivotally supported brake operating lever located within said brake drum; a rocking bearing between said brake operating lever and the middle portion of said brake shoe and the construction of which bearing is such that movement of said lever is communicated to said brake shoe through a pushing action, and in one direction only; and two adjustable springs permanently associated with said brake shoe and located one upon each side of the bearing aforesaid and the ends of which springs are detachably connected with said shoe, said springs being both under tension and acting to maintain the elements which provide said rocking bearing in engagement with one another.

11. In brake mechanism of the class described, a brake drum; a brake shoe supporting lever suitably supported within and movable relative to said drum; a brake shoe operated by said lever; two curved seats formed one in said lever and the other in said brake shoe; a spool arranged between said lever and said shoe and within the curved seats aforesaid; and two springs located one upon each side of said spool, one end of each spring being connected with said shoe and the other with said lever.

12. In brake mechanism of the class described, a brake drum; a brake shoe supporting lever suitably supported within and movable relative to said drum; a brake shoe operated by said lever; two curved seats formed one in said lever and the other in said brake shoe; a spool arranged between said lever and said shoe and within the curved seats aforesaid; and two tension springs permanently assembled with said lever and located one upon each side of said spool, the free ends of said springs being detachably connected with said shoe.

In testimony whereof I affix my signature.

J. W. WHITE, Jr.